Patented Feb. 25, 1930

1,748,633

UNITED STATES PATENT OFFICE

EDGAR C. BRITTON AND WILLIAM H. WILLIAMS, OF MIDLAND, MICHIGAN, ASSIGNORS TO THE DOW CHEMICAL COMPANY, OF MIDLAND, MICHIGAN, A CORPORATION OF MICHIGAN

INSECTICIDE

No Drawing.  Application filed October 20, 1925. Serial No. 63,754.

The present improved insecticidal composition is based on the discovery that pyrrolidine and pyrrolidine derivatives, properly prepared and used, possess an hitherto unsuspected efficacy in dealing with insect pests and particularly with aphis. Pyrrolidine, which is a colorless strongly alkaline base, is usually represented by the formula

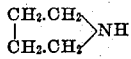

and, as indicated by such formula, may be also designated tetramethylene-amine (Ladenburg, B. 19, 782; 20, 442). Various methods are known for the preparation of this compound and derivatives, several being described for example in Bernthsen's "Text Book of Organic Chemistry" (1912 ed. p. 519). An improved method for the preparation of pyrrolidine derivatives is also disclosed in Patent No. 1,607,605 to E. C. Britton. The invention, accordingly, consists of the ingredients hereinafter fully described and particularly pointed out in the claims, the following description setting forth but several of various combinations of such ingredients which are satisfactory for the purpose stated and are contemplated as coming within the scope of the invention.

As a preferred pyrrolidine derivative we employ 1-butyl pyrrolidine

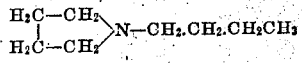

which may be readily prepared from dibutyl amine by first forming thereof N-bromo dibutyl amine and then converting the latter into the corresponding nitrogen ring compound. The resulting butyl pyrrolidine is a colorless compound with an odor resembling pure nicotine and piperidine. It is poisonous and nauseating after working with it for some time and has a boiling point of 151 degrees C. By substituting an equivalent weight of di-isoamyl amine for the dibutyl amine in the example just given, 1-isoamyl 3-methyl pyrrolidine, which has a boiling point of 176 degrees C., may be produced, and in an analogous manner or by other known methods, a variety of so-called pyrrolidine derivatives are obtainable. However, considering the cost of the materials as well as the efficacy of the compound for the present purpose, the above mentioned 1-butyl pyrrolidine is the most desirable.

In employing these compounds as an insecticide, or more specifically as an aphicide, they are converted into the form of sulphates by reaction with sulphuric acid. Such sulphates are readily soluble in water and will be ordinarily made up in the form of a concentrated solution for storage and shipment, but before use will be diluted to one to two parts per 1000. This solution is then readily sprayed or otherwise applied to growing plants and has been found by actual test to be highly effective as an insecticide for aphis and other similar sucking insects, as well as for the red spider, etc., that at times prove so destructive to fruit trees, flowering plants and shrubs.

Other modes of applying the principle of our invention may be employed instead of the one explained, change being made as regards the materials employed, provided the ingredients stated by any of the following claims or the equivalent of such stated ingredients be employed.

We therefore particularly point out and distinctly claim as our invention:—

1. An insecticidal compound, comprising a pyrrolidine derivative obtained from a dialkyl amine containing a methyl group three carbons removed from the nitrogen atom.

2. An insecticidal compound comprising 1-butyl pyrrolidine.

3. An insecticidal compound comprising a water soluble salt of a pyrrolidine derivative obtained from a dialkyl amine containing a methyl group three carbons removed from the nitrogen atom.

4. An insecticidal compound comprising a water soluble salt of 1-butyl pyrrolidine.

5. An insecticidal compound comprising the sulphate of 1-butyl pyrrolidine dissolved in water.

Signed by us, this 17th day of October, 1925.

EDGAR C. BRITTON.
WILLIAM H. WILLIAMS.